United States Patent
Furuta et al.

(10) Patent No.: US 7,079,003 B2
(45) Date of Patent: Jul. 18, 2006

(54) SECONDARY BATTERY WITH PROTECTIVE CIRCUIT

(75) Inventors: Kazutaka Furuta, Kanuma (JP); Masami Kawazu, Kanuma (JP)

(73) Assignees: Sony Corporation, Tokyo (JP); Sony Chemical Corp., Tokyo (JP)

( * ) Notice: Subject to any disclaimer, the term of this patent is extended or adjusted under 35 U.S.C. 154(b) by 8 days.

(21) Appl. No.: 11/094,717

(22) Filed: Mar. 31, 2005

(65) Prior Publication Data

US 2005/0225421 A1 Oct. 13, 2005

Related U.S. Application Data

(63) Continuation of application No. PCT/JP03/12768, filed on Oct. 6, 2003.

(30) Foreign Application Priority Data

Oct. 9, 2002 (JP) .............................. 2002-295656

(51) Int. Cl.
*H02H 7/18* (2006.01)
(52) U.S. Cl. ...................... 337/184; 361/104; 361/106
(58) Field of Classification Search ........ 337/182–185; 320/134, 150, 158, 154; 429/1, 7, 61, 62, 429/92, 93; 361/103, 104, 106
See application file for complete search history.

(56) References Cited

U.S. PATENT DOCUMENTS

| | | | | |
|---|---|---|---|---|
| 6,172,482 B1 * | 1/2001 | Eguchi | ....................... | 320/134 |
| 2002/0039270 A1 * | 4/2002 | Sato | .......................... | 361/93.1 |
| 2003/0134183 A1 * | 7/2003 | Iwasaki et al. | ............... | 429/62 |

FOREIGN PATENT DOCUMENTS

| EP | 0 982 826 A2 | | 3/2000 |
|---|---|---|---|
| JP | 02087935 | * | 3/1990 |
| JP | 09327131 | * | 12/1997 |
| JP | A 2002-017040 | | 1/2002 |
| JP | 2002191130 | * | 7/2002 |
| JP | 2002281660 | * | 9/2002 |
| JP | A 2002-281660 | | 9/2002 |

* cited by examiner

*Primary Examiner*—Lisa Lea-Edmonds
*Assistant Examiner*—Corey Broussard
(74) *Attorney, Agent, or Firm*—Oliff & Berridge, PLC (57) ABSTRACT

A secondary battery of the present invention a heat-sensitive element which varies in resistance value due to change of temperature is not placed on a path through which a charge or discharge current flows into or out of a storage battery. Accordingly, when a main switch element generates heat due to an overcurrent, a change in resistance value of the heat-sensitive element resulting from the heat will allow an auxiliary switch to be turned ON, thereby causing first and second auxiliary fuses to be blown. The charge or discharge current causes no power consumption at the heat-sensitive element, thereby providing high efficiency. The heat-sensitive element can be reduced in current capacity for use and it is suitable for compact design.

5 Claims, 8 Drawing Sheets

SECONDARY BATTERY WITH PROTECTIVE CIRCUIT

This is a Continuation of International Application No. PCT/JP03/12768 filed Oct. 6, 2003. The entire disclosure of the prior application is hereby incorporated by reference herein in its entirety.

BACKGROUND

The present invention relates to the technical field of secondary batteries which are capable of repeatedly performing charge and discharge operations, and more particularly to a secondary battery which includes a protective circuit.

Conventionally, secondary batteries which include a protective circuit have been used with cellular phones or portable personal computers. With increasing charge capacities, there have been increasing demands for a further improved protective circuit.

Figure 16:
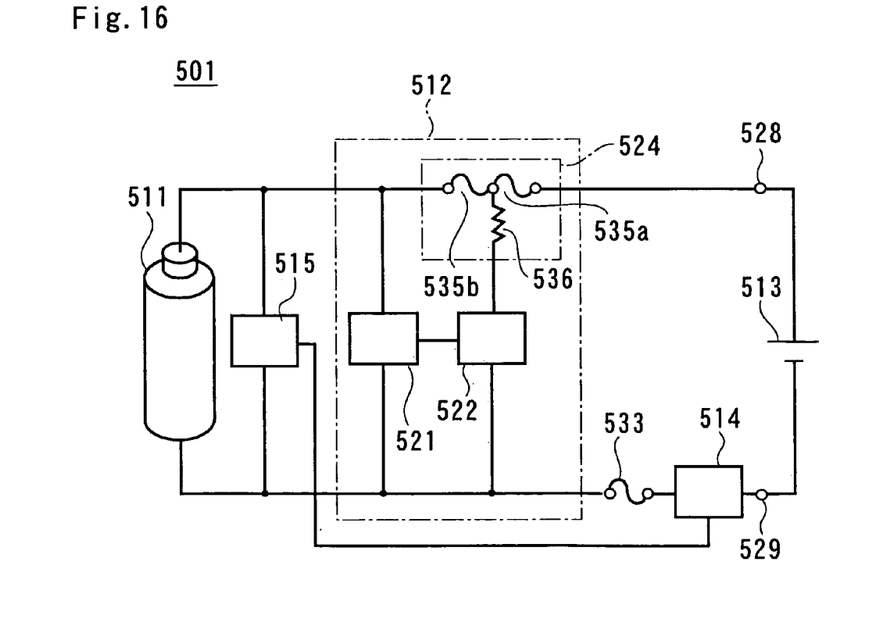
FIG. 16 is an exemplary diagram of a conventional secondary battery.

Reference numeral 501 of FIG. 16 indicates a conventional secondary battery, which includes a storage battery device 511, a control circuit 515, a protective circuit 512, a main switch element 514, and a main fuse element 533.

The storage battery device 511 has a high-voltage output terminal connected to a first output terminal 528 via the protective circuit 512 and a ground output terminal connected to a second output terminal 529 via the main fuse element 533 and the main switch element 514.

The turning ON and OFF of the main switch element 514 is controlled by the control circuit 515. However, in the following descriptions, it is to be understood that the main switch element 514 is maintained in an ON state.

The storage battery device 511 is capable of repeatedly performing charging and discharging operations. When a battery charger 513 is connected between the first and second output terminals 528 and 529, a charge current flows through the protective circuit 512, the main fuse element 533, and the main switch element 514, allowing the storage battery device 511 to be charged.

An external circuit such as a portable personal computer may replace the battery charger 513. In this case, the storage battery device 511 discharges to allow a discharge current, opposed in direction to the charge current. The discharge current flow through the protective circuit 512, the main fuse element 533, and the main switch element 514 to be supplied to the external circuit.

The protective circuit 512 has a voltage sensor circuit 521, an auxiliary switch element 522, and a fuse circuit 524. The fuse circuit 524 has first and second auxiliary fuse elements 535a and 535b and a heater element 536 comprising a resistive heating element.

The first and second auxiliary fuse elements 535a and 535b are connected in series. This series circuit allows the high-voltage output terminal of the storage battery device 511 to be connected to the first output terminal 528.

A point where first and second auxiliary fuse elements 535a and 535b are connected to each other is connected to the auxiliary switch element 522 via the heater element 536.

The voltage sensor circuit 521 provides control to turn ON or OFF the auxiliary switch element 522. The voltage sensor circuit 521 detects the voltage between the high-voltage output terminal and the ground output terminal of the storage battery device 511. If the resulting voltage is less than or equal to a predetermined upper limit voltage value, the voltage sensor circuit 521 maintains the auxiliary switch element 522 in an OFF state, thereby preventing any current from flowing through the heater element 536.

On the other hand, a faulty connection of the secondary battery 501 would result in the storage battery device 511 being overcharged, thereby causing a voltage equal to or greater than the upper limit voltage value to apply on the high-voltage output terminal of the storage battery device 511. In this case, the voltage sensor circuit 521 will detect the overvoltage to turn ON the auxiliary switch element 522. As a result, a large current flows through the heater element 536 to generate heat.

The heater element 536 and the first and second auxiliary fuse elements 535a and 535b are placed in close proximity to each other. When a large current flows through the heater element 536 and generates heat, the first and second auxiliary fuse elements 535a and 535b will be blown, thereby causing the high-voltage output terminal of the storage battery device 511 to be disconnected from the first output terminal 528.

As a result, the storage battery device 511 is no longer charged, thus preventing a hazard such as generating smoke.

On the other hand, suppose that the first and second output terminals 528 and 529 are shorted out therebetween even under the normal charge condition of the storage battery device 511. In this case, the discharge of the storage battery device 511 may cause a large overcurrent, which flows through the first and second auxiliary fuse elements 535a and 535b, the main switch element 514, and the main fuse element 533.

The main fuse element 533 is placed in close contact with the main switch element 514. When the main switch element 514 breaks down or a large overcurrent flows therethrough to thereby generate heat, the main fuse element 533 will be blown due to the heat. As a result, the ground output terminal of the storage battery device 511 is disconnected from the second output terminal 529 and the storage battery device 511 is no longer discharged, thereby preventing a hazard such as generating smoke.

However, the secondary battery 501 as described above has the main fuse element 533 is located at some midpoint on the path through which a charge or discharge current flows. This raises a problem that the main fuse element 533 wastes power, causing the working hours of the secondary battery 501 to be reduced.

Furthermore, for the secondary battery 501 having a large rated current, it is necessary to employ the main fuse element 533 having a current capacity as required. Accordingly, this raises a problem that the main fuse element 533 increases in outer size and is manufactured at higher costs.

In recent years, for the portable personal computer, there have been increasing demands for reduction in size and longer operating hours, which in turn requires improvements of the secondary battery 501.

The present invention was developed to address the aforementioned conventional drawbacks.

SUMMARY

An object of the invention is to provide a secondary battery which features low power consumption and compactness.

To solve the aforementioned problems, the present invention provides a secondary battery that includes a storage battery, a protective circuit, and first and second output terminals. The secondary battery is configured such that when a battery charger is connected to the first and second output terminals, a charge current supplied by the battery charger flows through the protective circuit to charge the storage battery. When an external circuit is connected to the first and second output terminals, a discharge current from the storage battery flows through the protective circuit to be supplied to the external circuit. In the secondary battery, the protective circuit includes: a heat-sensitive element which varies in resistance due to heat generated at a temperature sense portion; an auxiliary switch which is in an OFF state before the resistance value of the heat-sensitive element is changed and brought into an ON state by the change in the resistance value; a heater element allowing a current to flow when the auxiliary switch is turned ON to generate heat; and a first auxiliary fuse that is blown when heat is generated by the heater element and disconnects the first output terminal from the storage battery and the heater element.

The present invention provides a secondary battery in which the heat-sensitive element employs a main fuse that is blown when heat is generated at the temperature sense portion.

The present invention provides a secondary battery in which the heat-sensitive element employs a resistor that which varies in resistance value when heat is generated at the temperature sense portion.

The present invention provides a secondary battery in which the auxiliary switch employs a transistor and the protective circuit includes a two-terminal circuit having a resistor and the heat-sensitive element connected in series to each other. In this arrangement, one end of the two-terminal circuit is connected to a high-voltage output terminal of the storage battery and the other end is connected to a ground output terminal of the storage battery. A point at which the resistor and the heat-sensitive element are connected serves as an input to a control terminal of the transistor.

The present invention provides a secondary battery in which the protective circuit includes a second auxiliary fuse that is blown when heat is generated by the heater element and terminates a current flowing into the auxiliary switch.

The present invention provides a secondary battery configured such that a main switch is provided on a path through which the charge current and the discharge current flow, and the charge current and the discharge current are controlled by the main switch. In this arrangement, the temperature sense portion is the main switch.

The present invention is configured as described above, and a change in temperature at a temperature sense portion causes a change in resistance value of the heat-sensitive element.

The present invention is also configured such that an enhanced thermal portion is provided between the temperature sense portion and the heat-sensitive element. Thus, when the thermally enhanced portion is damaged, or a large overcurrent flows which is greater than a normal charge or discharge current into or out of the storage battery, resulting in heat being generated, the heat-sensitive element rises in temperature due to the heat.

As used herein, the heat-sensitive element includes a PTC thermistor which increases in resistance value due to an increase in temperature, an NTC thermistor and a CTR thermistor which decrease in resistance value due to an increase in temperature as well as a fuse which is blown due to an increase in temperature to have an infinite resistance value.

In summary, the present invention would also include a circuit in which a heat-sensitive element that varies in resistance value due to a change in temperature at the temperature sensor is placed on a path other than one through which a charge or discharge current flows, and a change in resistance value of the heat-sensitive element causes the auxiliary switch to be turned ON and thereby the first auxiliary fuse to be blown.

DETAILED DESCRIPTION OF EMBODIMENTS

Figure 1:
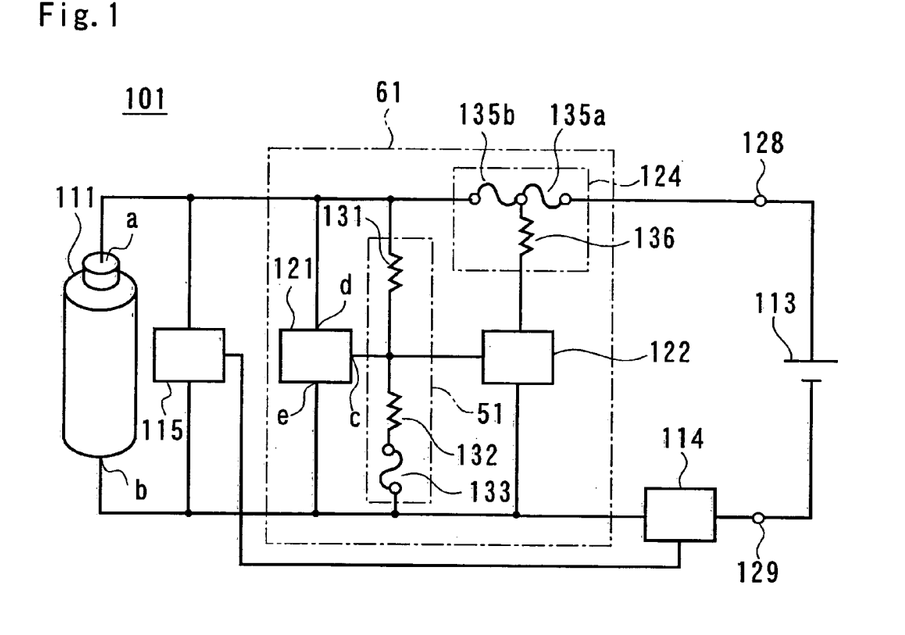
FIG. 1 is an exemplary diagram of a secondary battery according to a first embodiment of the present invention.

Referring to FIG. 1, reference numeral 101 indicates a secondary battery according to a first embodiment of the present invention.

The secondary battery 101 includes a storage battery device 111, a control circuit 115, a protective circuit 61, and a main switch element 114.

The turning ON and OFF of the main switch element 114 is controlled by the control circuit 115. However, in the following descriptions, it is to be understood that the main switch element 114 is maintained in an ON state.

The storage battery device 111 has a high-voltage output terminal "a" connected to a first output terminal 128 via the protective circuit 61 and a ground output terminal "b" connected to a second output terminal 129 via the main switch element 114.

The storage battery device 111 is capable of repeatedly performing charge and discharge operations. When a battery charger 113 is coupled between the first and second output terminals 128 and 129, a charge current supplied from the battery charger 113 flows through the protective circuit 61 and the main switch element 114, allowing the storage battery device 111 to be charged with the charge current.

An external circuit such as a portable personal computer may replace the battery charger 113. In this case, the storage battery device 111 provides a discharge current, which flows through the protective circuit 61 and the main switch element 114 to be supplied to the external circuit.

The protective circuit 61 has a voltage sensor circuit 121, an auxiliary switch element 122, a main fuse circuit 51, and an auxiliary fuse circuit 124.

The auxiliary fuse circuit 124 has first and second auxiliary fuse elements 135a and 135b and a heater element 136 including a resistive heating element.

The first and second auxiliary fuse elements 135a and 135b are connected in series. In this series circuit, the terminal on the first auxiliary fuse element 135a side is connected to the first output terminal 128, while the terminal on the second auxiliary fuse element 135b side is connected to the high-voltage output terminal "a" of the storage battery device 111. Therefore, the terminal on the high-voltage side of the storage battery device 111 connects to the first output terminal 128 via the series circuit of the first and second auxiliary fuse elements 135a and 135b.

The auxiliary switch element 122 may be an n-channel MOSFET or an npn bipolar transistor. When the n-channel MOSFET is employed, its source terminal is connected to the ground output terminal "b" of the storage battery device 111. The drain terminal of the auxiliary switch element 122 is connected with one end of the heater element 136, while the other end of the heater element 136 is connected to a connection point at which the first and second auxiliary fuse elements 135a and 135b are connected to each other.

In this secondary battery 101 according to the first embodiment, the gate terminal of the auxiliary switch element 122 is connected to an output terminal "c" of the voltage sensor circuit 121.

The main fuse circuit 51 includes first and second voltage divider resistance elements 131 and 132 and a main fuse element 133. The gate terminal of the auxiliary switch element 122 is connected to the high-voltage output terminal "a" of the storage battery device 111 via the first voltage divider resistance element 131.

Additionally, the gate terminal of the auxiliary switch element 122 is connected to the ground output terminal "b" of the storage battery device 111 via the series circuit of the second voltage divider resistance element 132 and the main fuse element 133.

While the storage battery device 111 is being charged or discharging under normal condition, the voltage sensor circuit 121 is in an open state delivering no signal.

In this state, when the resistance value of the main fuse element 133 is neglected, a magnitude of the voltage applied to the gate terminal of the auxiliary switch element 122 is a magnitude of the voltage where the voltage output from the storage battery device 111 is divided by the first and second voltage divider resistance elements 131 and 132.

The voltage is less than the threshold voltage of the auxiliary switch element 122, and the auxiliary switch element 112 is in an OFF state.

When the voltage sensor circuit 121 detects a voltage equal to or greater than the upper limit voltage under this state, a high-voltage signal is output, allowing the auxiliary switch element 122 to be turned ON.

While the auxiliary switch element 122 is in an OFF state, no current flows through the heater element 136. However, once the drain terminal is connected to the ground output terminal "b" in an ON state, a voltage is applied to the ends of the heater element 136 allowing a current to flow through the heater element 136.

In this condition, the heater element 136 allows both a current supplied from the battery charger 113 and a current supplied from the storage battery device 111 to flow therethrough.

The heater element 136 generates heat by the current flowing therethrough, and the heat causes the first and second auxiliary fuse elements 135a and 135b to be blown.

The blowout of the first and second auxiliary fuse elements 135a and 135b will cause both the current from the battery charger 113 and the current from the storage battery device 111 to terminate, resulting in no current flowing through the heater element 136.

In this condition, the high-voltage output terminal "a" of the storage battery device 111 is disconnected from the first output terminal 128 allowing no current to flow, thereby preventing a hazard such as generating smoke.

On the other hand, suppose that even under the normal charge condition of the storage battery device 111, the first and second output terminals 128 and 129 are shorted out therebetween causing an overcurrent to flow through the main switch element 114 or the main switch element 114 breaks down to allow an overcurrent to flow therethrough.

In such a case, although the voltage sensor circuit 121 will not operate, the main fuse element 133 and the main fuse element of each embodiment (with reference numerals 143, 153, 233, 243, 253, and 300) (discussed later) are placed in close contact with the main switch element 114 according to this embodiment and each of the embodiments discussed later to operate as follows. That is, heat generated by the main switch element 114 due to the overcurrent causes the main fuse element 133 to be blown.

Therefore, with the main switch element 114 serving as a temperature sense portion, the main fuse element 133 may be blown due to heat generated by the temperature sense portion. In this case, the second voltage divider resistance element 132 is disconnected between the gate terminal of the auxiliary switch element 122 and the ground output terminal. As a result, the gate terminal is pulled up through the first voltage divider resistance element 131, allowing the auxiliary switch element 122 to be turned ON.

By the auxiliary switch element 122 being turned ON, a large discharge current from the storage battery device 111 flows through the heater element 136 to generate heat.

When the discharge current causes the second auxiliary fuse element 135b to be blown, the high-voltage output terminal "a" of the storage battery device 111 is disconnected from the first output terminal 128 and the heater element 136, thereby terminating the discharge current and preventing a hazard such as generating smoke.

Suppose that a battery charger providing an inappropriately large output voltage is connected between the first and second output terminals 128 and 129, and the voltage does not activate the voltage sensor circuit 121. In this case, as in the foregoing, an overcurrent flows through the main switch element 114 to generate heat, which causes the main fuse element 133 to be blown and thus the auxiliary switch element 122 to be turned ON. This action causes the heater element 136 to generate heat and thus the first auxiliary fuse element 135a to be blown, allowing the battery charger to be disconnected from the first output terminal 128 and the overcurrent to terminate.

In the foregoing, such a case has been explained in which the output terminal "c" of the voltage sensor circuit 121 is in an open state under normal operating condition. However, also included is a case in which under normal operating condition, the voltage sensor circuit 121 outputs a low voltage less than the threshold voltage to keep the auxiliary switch element 122 in an OFF state.

In this case, after the main fuse element 133 has been blown, the current flowing through the first voltage divider resistance element 131 flows into the voltage sensor circuit 121. Accordingly, a too low output impedance of the voltage sensor circuit 121 would never allow the auxiliary switch element 122 to be increased in voltage at the gate terminal and turned ON.

Figure 6:
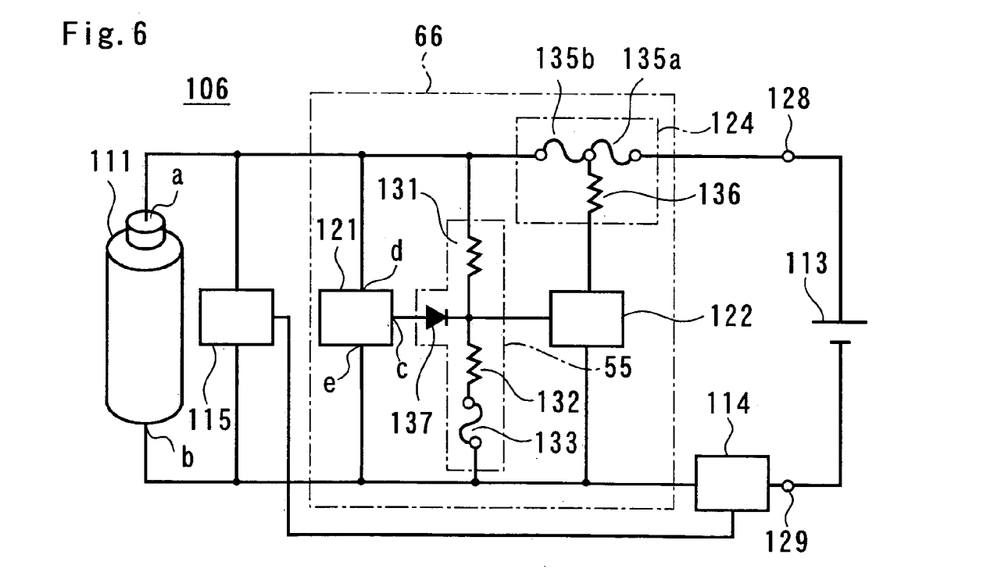
FIG. 6 is an exemplary diagram of a secondary battery with a diode added to the secondary battery of the first embodiment.

In this case, as in a secondary battery 106 shown in FIG. 6, a diode element 137 may be provided in a main fuse circuit 55, with the output terminal "c" of the voltage sensor circuit 121 connected to the anode terminal thereof and the cathode terminal connected to the gate terminal of the auxiliary switch element 122. The diode element 137 may be reverse biased after the main fuse element 133 is blown. This configuration allows the current flowing through the first voltage divider resistance element 131 to be blocked at the diode element 137 and prevented from flowing into the voltage sensor circuit 121. Thus, even with a low output impedance of the voltage sensor circuit 121, it is ensured that the auxiliary switch element 122 is turned ON.

In the foregoing, such a case has been described in which the first and second auxiliary fuse elements 135a and 135b are both blown. However, if either the first or the second fuse is blown, the storage battery device 111 is disconnected from the battery charger 113, thereby preventing a hazard such as generating smoke.

However, even if one of the fuses is blown earlier than the other, a current still continues to flow through the other fuse into the heater element 136. It is thus also possible to set such that the other remaining fuse is blown due to the heat generated by the heater element 136.

Figure 2:
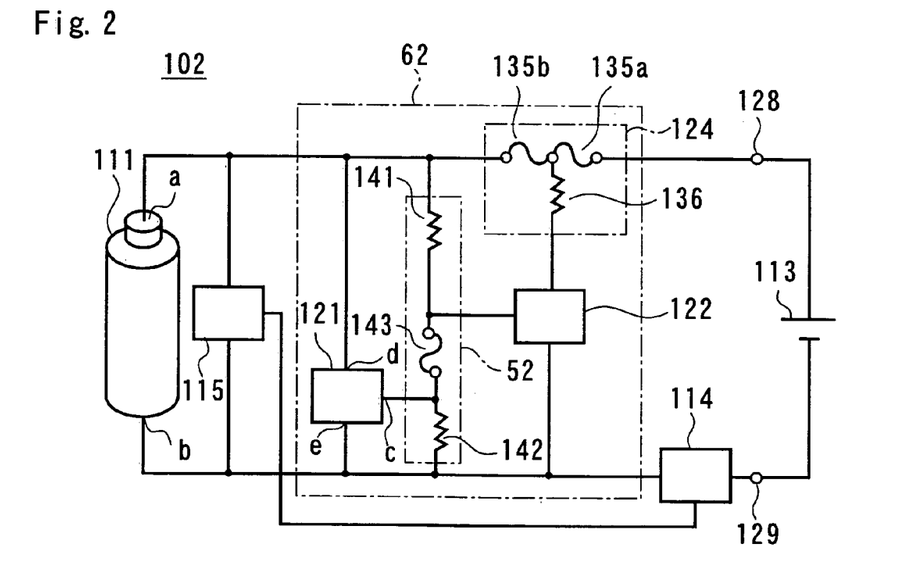
FIG. 2 is an exemplary diagram of a secondary battery according to a second embodiment of the present invention.

FIG. 2 shows a secondary battery 102 according to a second embodiment in which a protective circuit 62 is differently configured with respect to the main fuse circuit 51 of the first embodiment. In the secondary battery 102 of the second embodiment and secondary batteries 103 to 107, 201 to 207, and 301 according to respective embodiments (discussed later) the same components as those of the secondary battery 101 according to the first embodiment are indicated by like reference numerals. The components and their connections will not be explained repeatedly.

In a main fuse circuit 52 of the secondary battery 102 of the second embodiment (via a first voltage divider resistance element 141) the gate terminal of the auxiliary switch element 122 connects to the high-voltage output terminal "a" of the storage battery device 111, and via a second voltage divider resistance element 142, the output terminal "c" of the voltage sensor circuit 121 connects to the ground output terminal "b".

On the other hand, a main fuse element 143 makes a short circuit between the gate terminal of the auxiliary switch element 122 and the output terminal "c" of the voltage sensor circuit 121.

When the main switch element 114 generates heat due to an overcurrent or the like and the main fuse element 143 is blown due to the heat, the gate terminal of the auxiliary switch element 122 is disconnected from the output terminal "c" of the voltage sensor circuit 121. Accordingly, the current flowing through the first voltage divider resistance element 141 does not flow into the voltage sensor circuit 121. Thus, the voltage at the high-voltage output terminal "a" of the storage battery device 111 is applied to the gate terminal of the auxiliary switch element 122 via the first voltage divider resistance element 141, thereby ensuring that the auxiliary switch element 122 is turned ON.

In the secondary batteries 101 and 102 according to the aforementioned first and second embodiments, a power supply voltage terminal "d" and a ground terminal "e" of the voltage sensor circuit 121 are directly connected to the high-voltage output terminal "a" and the ground output terminal "b" of the storage battery device 111, respectively. However, this composition can be changed such that a blowout of the main fuse element causes the voltage sensor circuit 121 to stop operating, thereby ensuring that the auxiliary switch element 122 is turned ON.

Figure 3:
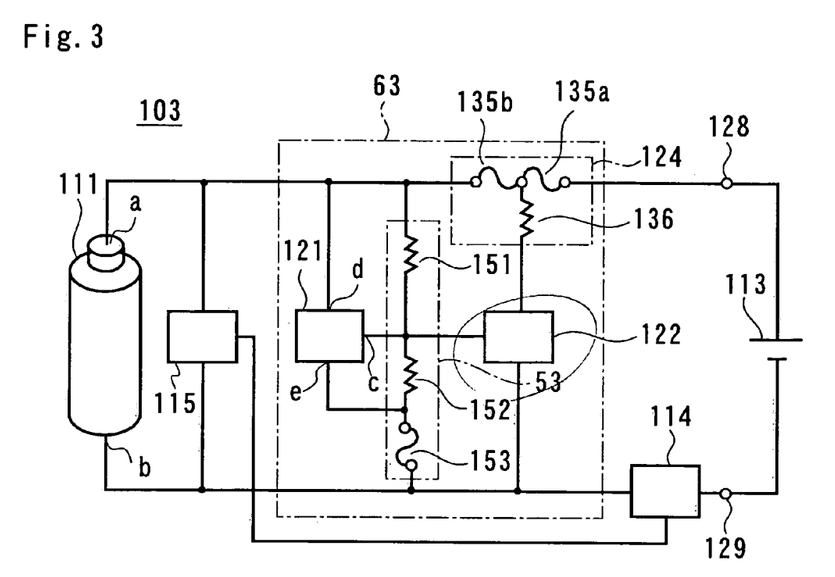
FIG. 3 is an exemplary diagram of a secondary battery according to a third embodiment of the present invention.

Reference numeral 103 of FIG. 3 indicates a secondary battery according to a third embodiment which is configured as such. According to the secondary battery 103 of the third embodiment, a main fuse circuit 53 in a protective circuit 63 is configured such that the gate terminal of the auxiliary switch element 122 is connected to the high-voltage output terminal "a" via a first voltage divider resistance element 151, and the gate terminal is connected to the ground output terminal "b" via a series circuit of a second voltage divider resistance element 152 and a main fuse element 153.

In the series circuit of the second voltage divider resistance element 152 and the main fuse element 153, the terminal on the second voltage divider resistance element 152 side is connected to the gate terminal of the auxiliary switch element 122 and the terminal on the main fuse element 153 side is connected to the ground output terminal "b".

The power supply voltage terminal "d" of the voltage sensor circuit 121 is directly connected to the high-voltage output terminal "a", whereas the ground terminal "e" is connected to a connection at which the second voltage divider resistance element 152 and the main fuse element 153 are connected to each other. Accordingly, the ground terminal "e" of the voltage sensor circuit 121 is connected to the ground output terminal "b" via the main fuse element 153.

In such a configuration, when the main switch element 114 generates heat causing the main fuse element 153 to be blown, the ground terminal "e" of the voltage sensor circuit 121 is disconnected from the ground output terminal "b" to stop operating.

Accordingly, the current having flown through the first voltage divider resistance element 151 does not flow through the voltage sensor circuit 121 into the ground output terminal "b", thereby causing no decrease in voltage at the gate terminal of the auxiliary switch element 122. Thus, the blowout of the main fuse element 153 allows the gate terminal of the auxiliary switch element 122 to be pulled up to the high-voltage output terminal "a" by the first voltage divider resistance element 151, thereby ensuring that the auxiliary switch element 122 is turned ON.

In the foregoing, the explanations were given to the secondary batteries 101 to 103 and 106 which employ the main switch element 114 as a temperature sense portion, allowing the main switch element 114 to generate heat and thereby the main fuse element 153 to be blown. However, in each of the aforementioned embodiments or those to be discussed later, other components, e.g., a battery charger or the control circuit 115 may be used as a temperature sense portion such that a heat-sensitive element such as the main fuse element 153 is placed in close contact with the temperature sense portion to allow the auxiliary switch element to be turned ON.

On the other hand, in the aforementioned secondary batteries 101 to 103 and 106, such a case has been explained in which the main fuse element 153 is used as the heat-sensitive element, which will have an infinite resistance value due to an increase in temperature. However, in place of the main fuse elements 133, 143, and 153 according to each of the aforementioned embodiments, it is also acceptable to use a thermistor which will increase or decrease in resistance value due to an increase in temperature.

Figure 4:
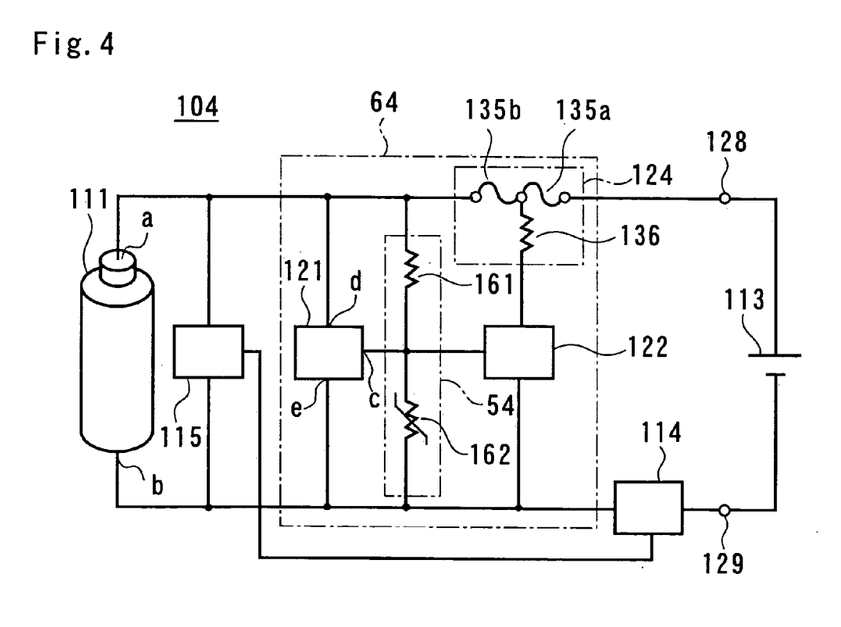
FIG. 4 is an exemplary diagram of a secondary battery according to a fourth embodiment of the present invention.

For example, reference numeral 104 of FIG. 4 shows a secondary battery according to a fourth embodiment in which the main fuse element 133 of the secondary battery 101 according to the first embodiment shown in FIG. 1 is replaced with a thermistor 162 which increases in resistance value due to an increase in temperature.

In the secondary battery 104 according to the fourth embodiment, a main fuse circuit 54 incorporated in a protective circuit 64 includes a series circuit of a voltage divider resistance element 161 and the thermistor 162. The gate terminal of the auxiliary switch element 122 is connected to the high-voltage output terminal "a" via the voltage divider resistance element 161 and to the ground potential output terminal "b" via the thermistor 162.

The thermistor 162 is placed in close contact with the surface of the main switch element 114, thereby providing an enhanced thermal coupling. Accordingly, when the main switch element 114 generates heat due to its malfunction or an overcurrent flowing therethrough, the heat will cause the thermistor 162 to increase in resistance value and potential of the gate terminal of the auxiliary switch element 122 to increase. When the potential at the gate terminal is at a voltage equal to or greater than the threshold voltage, the auxiliary switch element 122 is turned ON.

Additionally, in each of the aforementioned embodiments, the auxiliary fuse circuit 124 has the first and second auxiliary fuse elements 135a and 135b. However, the second auxiliary fuse element 135b is not always necessary.

Figure 5:
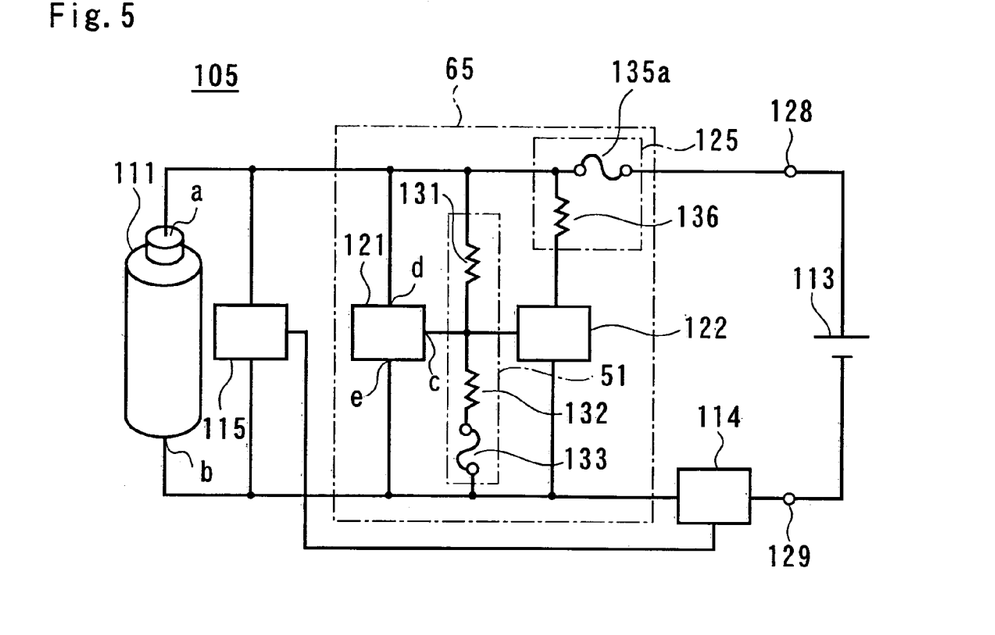
FIG. 5 is an exemplary diagram of a secondary battery according to a fifth embodiment of the present invention.

For example, reference numeral 105 in FIG. 5 indicates a secondary battery in which the secondary battery 101 according to the first embodiment shown in FIG. 1 is not provided with the second auxiliary fuse element 135b.

In the secondary battery 105, the auxiliary switch element 122 being turned ON causes the heater element 136 to generate heat and thus the first auxiliary fuse element 135a to be blown, thereby resulting in the first output terminal 128 to be disconnected from the internal circuit of the secondary battery 105.

Figure 7:
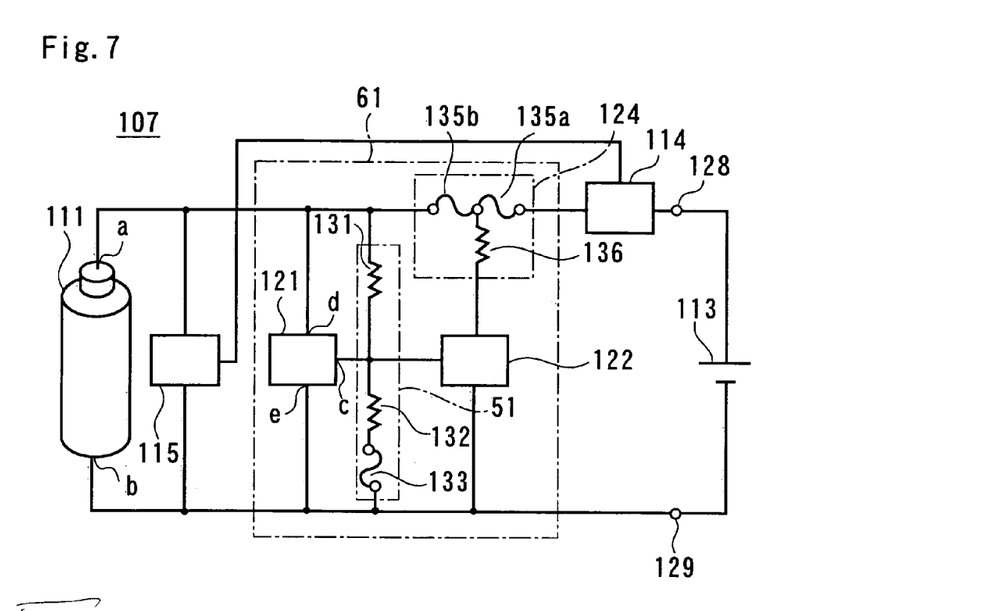
FIG. 7 is an exemplary diagram of a secondary battery with the main switch element in the secondary battery of the first embodiment being placed on a first output terminal side.
Figure 8:
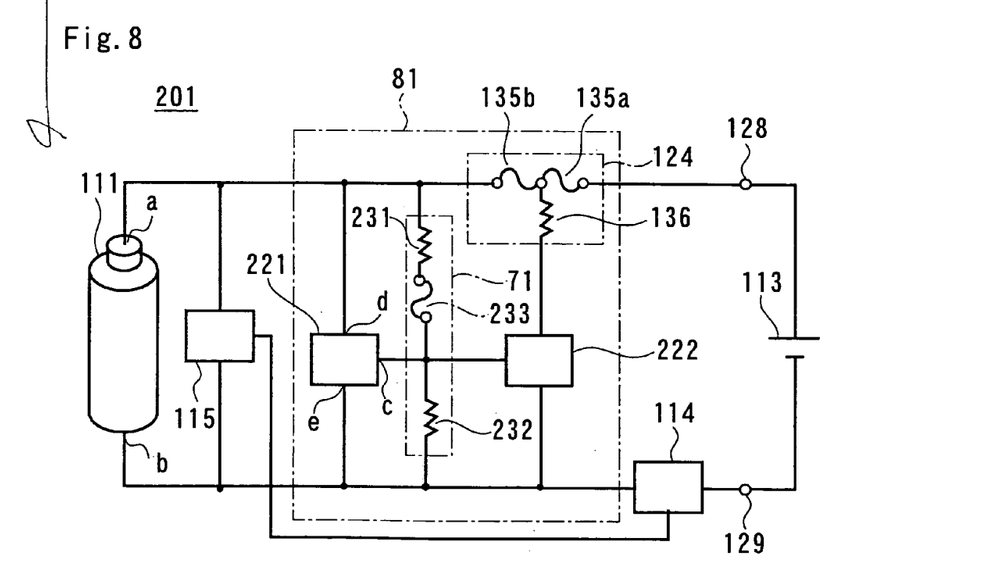
FIG. 8 is an exemplary diagram of the secondary battery of the first embodiment which employs a p-channel MOSFET or a pnp bipolar transistor.
Figure 9:
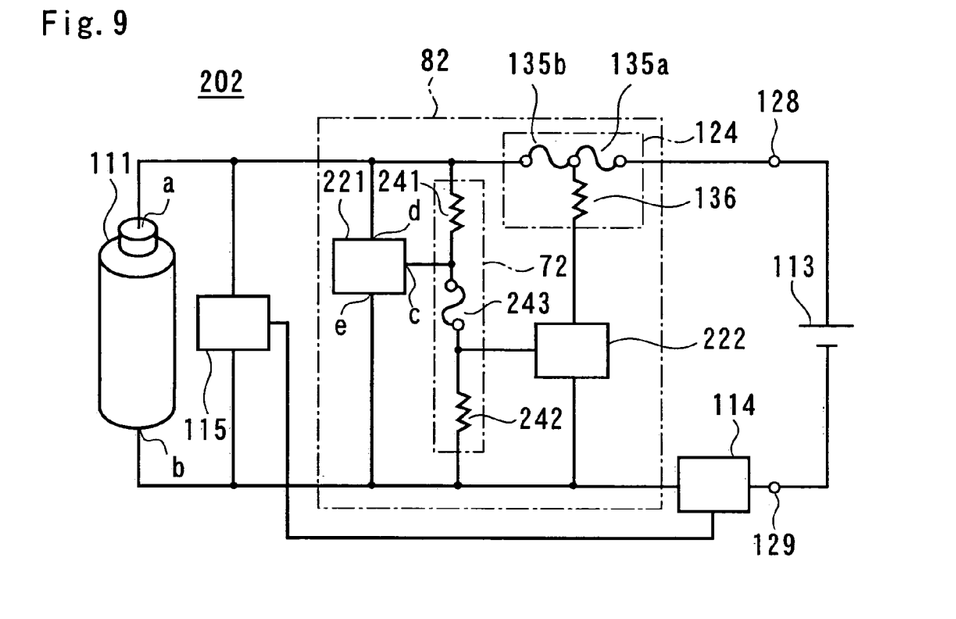
FIG. 9 is an exemplary diagram of the secondary battery of the second embodiment which employs a p-channel MOSFET or a pnp bipolar transistor.

In each of the aforementioned embodiments, the main switch element 114 is provided between the second output terminal 129 and the ground output terminal "b", but may also be interposed between the first output terminal 128 and the auxiliary fuse circuit 124, as shown in FIG. 7. In this case, the main fuse element 133 is configured to be placed also in close contact with the main switch element 114 and blown due to heat generated by an overcurrent flowing through the main switch element 114. On the other hand, a thermistor may be used in place of the main fuse element 133, in the case of which the thermistor is also placed so as to increase in resistance value due to heat generated by the main switch element 114.

Furthermore, in each of the aforementioned embodiments, the auxiliary switch element 122 is an n-channel MOSFET or an npn bipolar transistor. However, it is also possible to employ relay elements or other switch elements as well as a p-channel MOSFET or a pnp bipolar transistor.

In each of the secondary batteries 101 to 107 which employ an n-channel MOSFET or an npn bipolar transistor, the elements 133, 143, 153, and 162 which increase in resistance value due to heat generated by the main switch element 114 (including those elements which are blown to have an infinite resistance value) allow the gate terminal or the base terminal of the auxiliary switch element 122 to be connected to the ground output terminal "b". However, to use the p-channel MOSFET or the pnp bipolar transistor connected at the gate terminal or the base terminal with an element which increases in resistance value by the main switch element 114 generating heat due to an overcurrent, the element connects the gate terminal or the base terminal to the high-voltage output terminal "a".

Such secondary batteries are indicated by reference numerals 201 to 207 in FIGS. 8 to 14 corresponding to the secondary batteries 101 to 107 of FIGS. 1 to 7. Main fuse circuits corresponding to the main fuse circuits 51 to 55 of FIGS. 1 to 7 are indicated by reference numerals 71 to 75. The elements in the main fuse circuits 51 to 55 indicated by reference numerals with one in their hundred's place correspond to those indicated by reference numerals with two in their hundred's place in the main fuse circuits 71 to 75.

In the secondary batteries 201 to 207 of FIGS. 8 to 14, a voltage sensor circuit 221 is open at its output terminal "c" under the normal operational condition. A voltage between the high-voltage output terminal "a" and the ground output terminal "b" is divided by the fuse circuits 71 to 75 to be applied to the gate terminal and the base terminal of an auxiliary switch element 222.

The auxiliary switch element 222 is configured to be maintained in an OFF state with the voltage kept being applied thereto.

Also included is a case where the output terminal "c" of the voltage sensor circuit 221 is not open, and a high voltage is delivered to place the auxiliary switch element 222 in an OFF state.

Suppose that an overcurrent causes the main switch element 114 to generate heat and the main fuse element 233, 243, or 253 to be blown or a thermistor 262 to increase in resistance value. In this case, a low voltage close to the potential at the ground output terminal "b" is applied to the gate terminal or the base terminal of the auxiliary switch element 222.

The auxiliary switch element 222, which is formed of a p-channel MOSFET or a pnp bipolar transistor, is turned ON when a low voltage is applied thereto, causing a current to flow through the heater element 136 and the first and second auxiliary fuse elements 135a and 135b to be blown.

Figure 10:
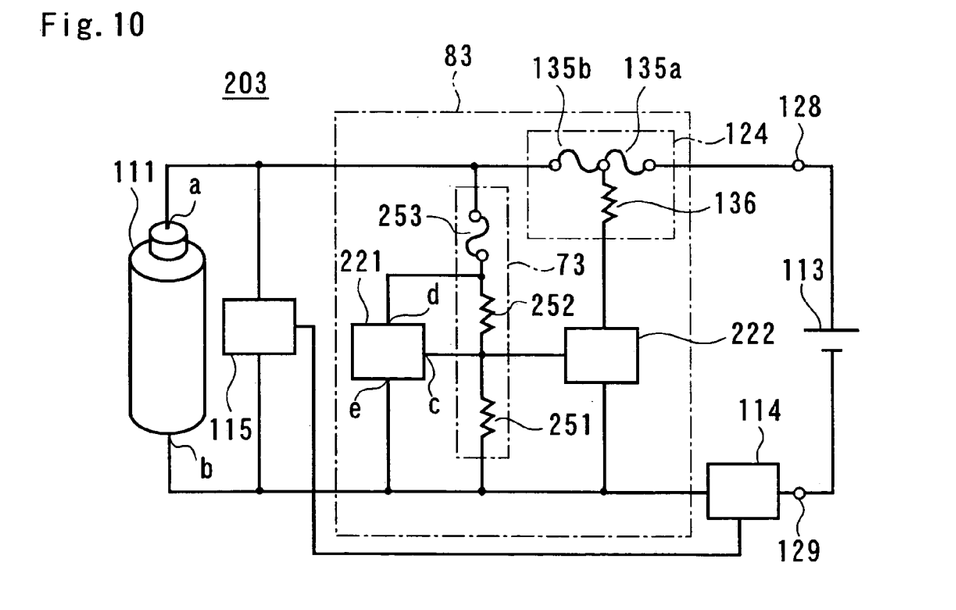
FIG. 10 is an exemplary diagram of the secondary battery of the third embodiment which employs a p-channel MOSFET or a pnp bipolar transistor.

In this case, as shown in FIG. 10, the main fuse element 253 is blown to stop the operation of the voltage sensor circuit 221. To this end, the power supply voltage terminal "d" of the voltage sensor circuit 221 can be connected between the main fuse element 253 and a second voltage divider resistance element 252, which are connected in series. To allow the main fuse element 253 to be blown, thereby disconnecting the power supply voltage terminal "d" from the high-voltage output terminal "a".

Figure 13:
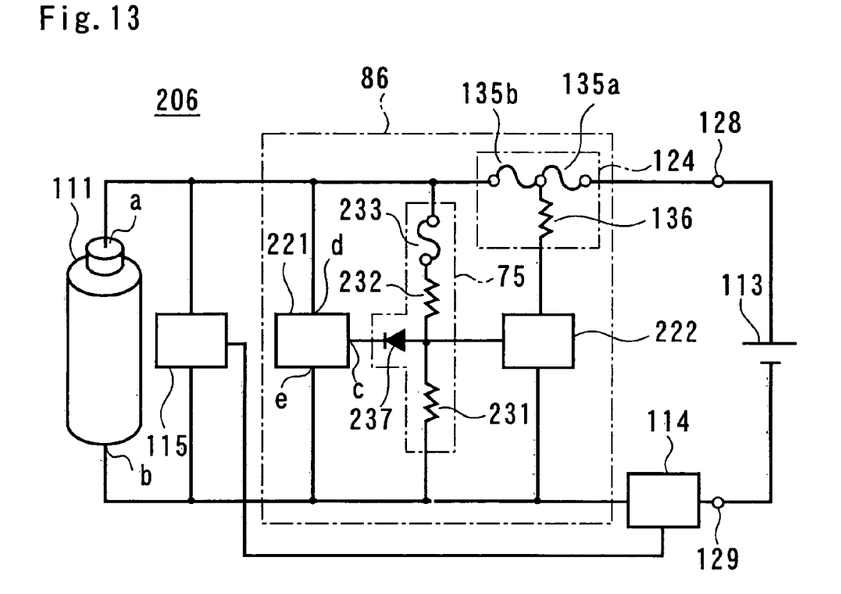
FIG. 13 is an exemplary diagram of the secondary battery of the first embodiment employing a p-channel MOSFET or a pnp bipolar transistor in which a diode added thereto.
Figure 14:
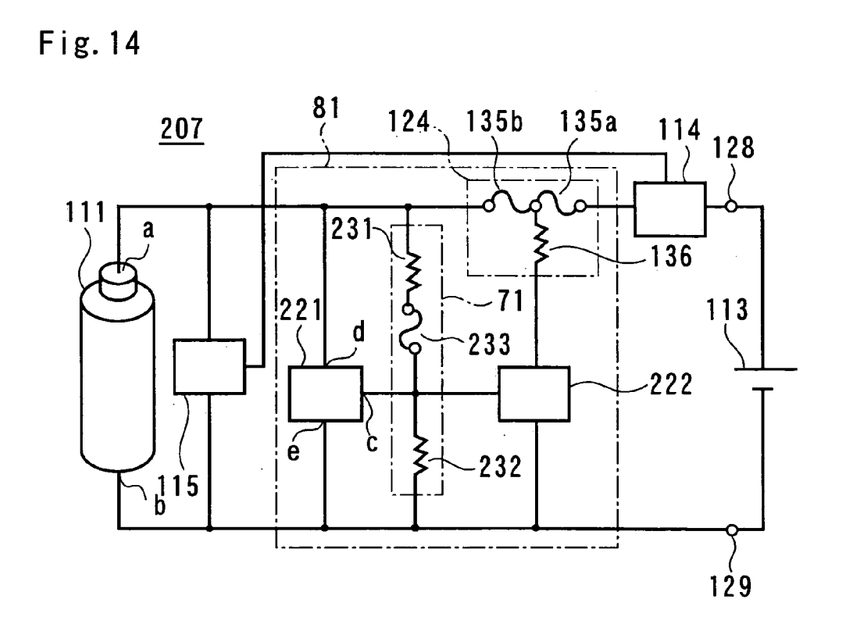
FIG. 14 is an exemplary diagram of a secondary battery in which the main switch element in the secondary battery of the first embodiment employing a p-channel MOSFET or a pnp bipolar transistor is placed on the first output terminal side.

As shown in FIG. 13, a diode element 237 can be connected to the output terminal "c" of the voltage sensor circuit 221. In this case, a main fuse element 233 is blown to allow a first resistance element 231 to pull down the gate terminal of the auxiliary switch element 222, thereby causing the auxiliary switch element 222 to be turned ON. At this time, to prevent the gate terminal from rising in potential due to a current delivered by the voltage sensor circuit 221, the anode terminal may be directed toward the gate terminal and the cathode terminal may be directed toward the output terminal "c" of the voltage sensor circuit 221, thereby preventing the current delivered from the voltage sensor circuit 221.

Figure 15:
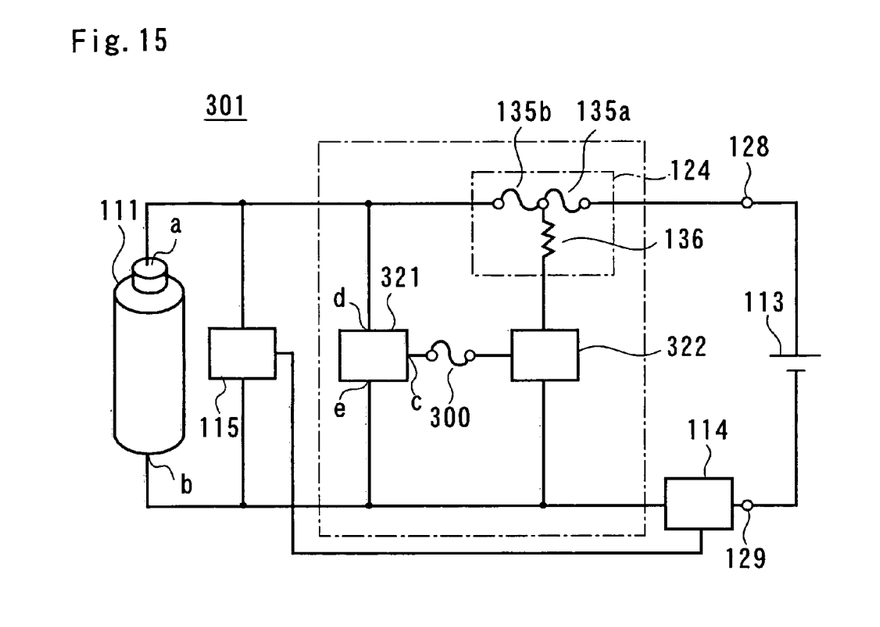
FIG. 15 is an exemplary diagram of a secondary battery in which the output terminal of a voltage sensor circuit connects to the gate terminal of an auxiliary switch element via an auxiliary fuse circuit.

In addition to each of the aforementioned embodiments, a secondary battery 301 shown in FIG. 15 is also included in the present invention.

The secondary battery 301 is configured such that the output terminal "c" of the voltage sensor circuit 321 is connected to the gate terminal or the base terminal of an auxiliary switch element 322 via a main fuse element 300.

The auxiliary switch element 322 is configured to be kept OFF while the auxiliary switch element 322 is receiving a signal indicative of a normal voltage detected by the voltage sensor circuit 321. Additionally, the auxiliary switch element 322 is also configured to be turned ON when the supply of the signal indicative of a normal voltage is stopped.

When an overcurrent flows through the main switch element 114 to generate heat, and the main fuse element 300 is blown by the heat, the signal indicative of the voltage sensor circuit 321 detecting a normal voltage stops being supplied to the gate terminal of the auxiliary switch element 322 irrespective of the signal delivered by the voltage sensor circuit 321. Accordingly, a blowout of the main fuse element 300 ensures that the auxiliary switch element 322 is turned ON allowing a current to flow through the heater element 136, thereby causing the first and second auxiliary fuse elements 135*a* and 135*b* to be blown.

Figure 11:
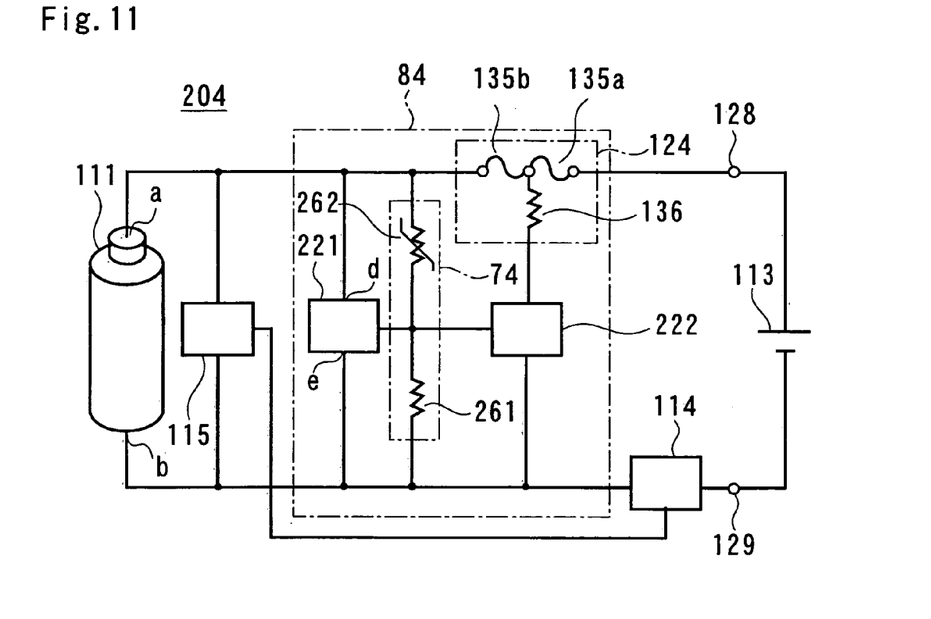
FIG. 11 is an exemplary diagram of the secondary battery of the fourth embodiment which employs a p-channel MOSFET or a pnp bipolar transistor.
Figure 12:
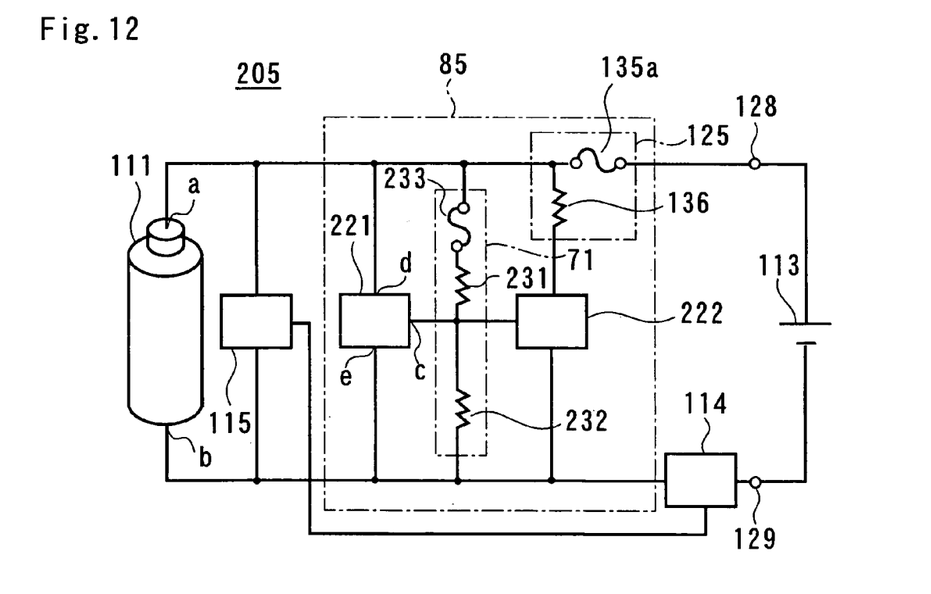
FIG. 12 is an exemplary diagram of the secondary battery of the fifth embodiment which employs a p-channel MOSFET or a pnp bipolar transistor.

In the circuit diagram of FIG. 11, the auxiliary switch element 222 may be replaced with an n-channel MOSFET or an npn transistor and the thermistor 262 may also be substituted by an element which reduces in resistance value due to an increase in temperature. In this arrangement, like each of the aforementioned embodiments, the heat generated by the main switch element 114 due to an overcurrent can be used to turn ON the auxiliary switch element 222.

The main fuse element, which is not placed on the path of charge or discharge current into or out of a storage battery device, causes no energy loss in the main fuse element during normal operation. It is also possible to employ a main fuse element having a reduced current capacity.

What is claimed is:

1. A secondary battery, comprising:
   a storage battery;
   a protective circuit;
   an auxiliary switch element;
   a heater element;
   a first auxiliary fuse element; and
   first and second output terminals, wherein:
   when a battery charger is connected to the first and second output terminals, a charge current supplied by the battery charger flows through the protective circuit to charge the storage battery;
   when an external circuit is connected to the first and second output terminals, a discharge current from the storage battery flows through the protective circuit and is supplied to the external circuit; and
   the protective circuit includes:
   a series circuit of a first resistance element, a second resistance element and a main fuse element being connected in series with each other, wherein
   the series circuit is connected between a high-voltage output terminal and a low-voltage output terminal of the storage battery,
   the voltage between the high-voltage output terminal and the low-voltage output terminal is divided by the first resistance element and the second resistance element to generate a divided voltage before blowout of the main fuse element,
   the divided voltage is inputted to the auxiliary switch element so that the auxiliary switch element is in an OFF state,
   the auxiliary switch element is connected to the high-voltage output terminal or the low-voltage output terminal by the first or second resistance element so as to be brought into an ON state when the main fuse element is blown by heat generated at a temperature sense portion,
   the heater element is allowed a current to flow therethrough when the auxiliary switch element is turned ON to generate heat; and
   the first auxiliary fuse is blown by heat generated by the heater element, and disconnects the first output terminal from the storage battery and the heater element.

2. The secondary battery according to claim 1, wherein the protective circuit includes a second auxiliary fuse that is blown when heat is generated by the heater element, disconnects the auxiliary switch element from the element storage battery, and terminates a current flowing into the auxiliary switch element.

3. The secondary battery according to claim 1, wherein a main switch element is provided on a path through which the charge current and the discharge current flow;
the charge current and the discharge current are controlled by the main switch; and
the temperature sensor is the main switch element.

4. The secondary battery according to claim 1, further comprising a voltage sensor circuit that detects a voltage applied to the storage battery from the first and second output terminals, wherein the voltage sensor circuit is connected to the auxiliary switch element, and the auxiliary switch element turns ON when the voltage sensor circuit detects a voltage equal to or greater than the upper limit voltage.

5. The secondary battery according to claim 4, wherein a diode element is provided between the voltage sensor circuit and the auxiliary switch element, and the diode element is reverse biased after blowout of the main fuse element so that the voltage sensor circuit is disconnected from the auxiliary switch element.

* * * * *